Aug. 9, 1932.  J. W. SMITH  1,871,394
MULTIFOCAL EYE TESTING DEVICE
Filed Dec. 6, 1928
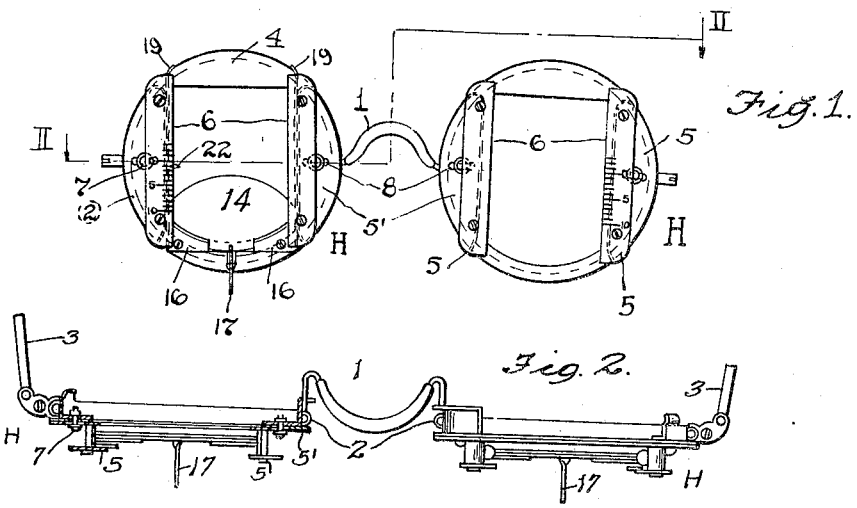
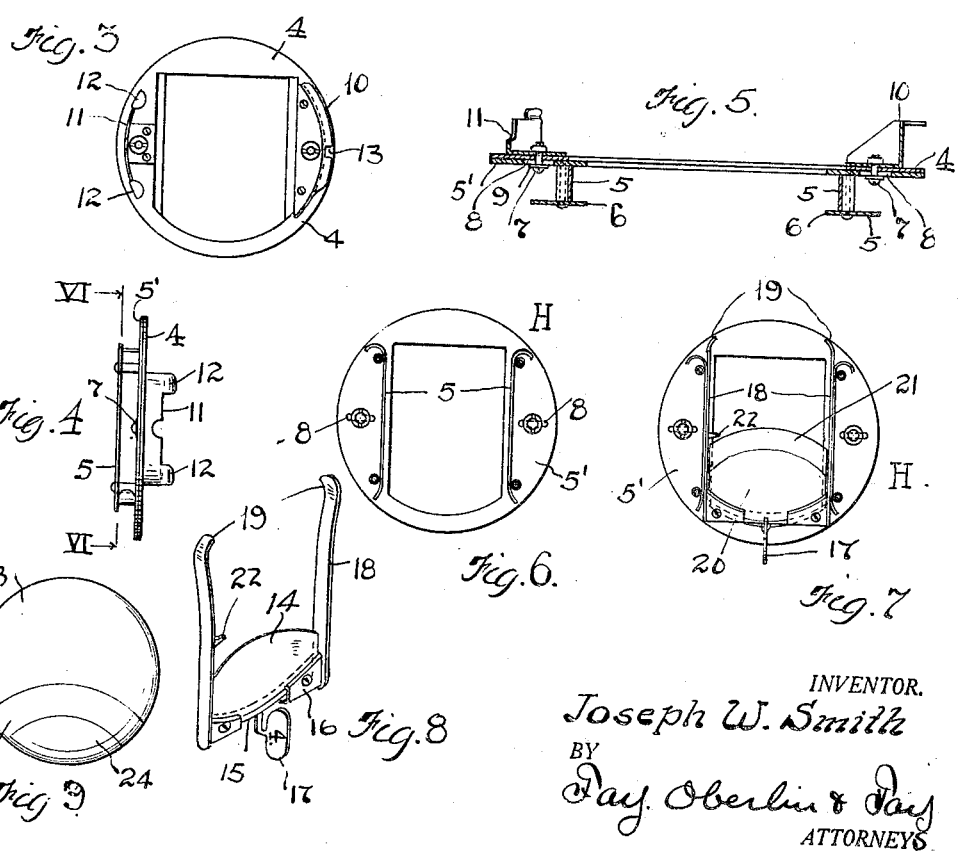
INVENTOR.
Joseph W. Smith
BY
Day, Oberlin & Day
ATTORNEYS Patented Aug. 9, 1932

1,871,394

UNITED STATES PATENT OFFICE

JOSEPH W. SMITH, OF CAMBRIDGE, OHIO

MULTIFOCAL EYE-TESTING DEVICE

Application filed December 6, 1928. Serial No. 324,112.

This invention relates to optical devices, and more particularly eye-testing equipment for determining refractive corrections; and it is among the objects of the invention to provide apparatus for presenting test lenses in accurate simulation of the ultimate conditions of use in bifocal or trifocal glasses. A further object is the provision of segmental test lenses in a convenient mounting facilitating quick changes without interference with accuracy. Other objects and advantages will appear as the description proceeds.

To the accomplishment of the foregoing and related ends, the invention, then, consists of the features hereinafter fully described, and particularly pointed out in the claims, the following description and the annexed drawing setting forth certain structure illustrative of the invention, such involving however but a few of the various ways in which the principle of the invention may be employed.

In said annexed drawing:—

Fig. 1 is a front elevation showing an embodiment of the invention; Fig. 2 is a plan view thereof with left half in section, as indicated by the line II—II, Fig. 1; Figs. 3 and 4 are rear and side elevations respectively of a detail; Fig. 5 is an enlarged transverse section of the same; Fig. 6 is a vertical section taken on a plane indicated by the line VI—VI, Fig. 4; Fig. 7 is a similar view with a lens segment in place; Fig. 8 is an enlarged perspective view of a test lens segment mount; and Fig. 9 is a front elevation of a finished trifocal lens.

Referring to Figs. 1 and 2, there is shown a spectacle frame comprising bridge 1, rims 2, and bows 3. The more nearly this is identical with the type of frame to be ultimately worn by the individual, the more accurate will be the results, for reasons which will be clear hereinafter. Adapted to be attached to the frame are test lens holders H which provide vertical guideways. These may be made up of a rim abutting plate 4 of a size to conveniently set in front of the frame rim, and secured to such abutting plate on its front face are guide pieces 5, these having opposed flanges 6, such that the guideways formed thereby are spaced at a suitable distance across the field of the eye. These guideways 5 are adjustable laterally, and as a convenient construction to this end, the guide-carrying plate 5′ is slidably connected to the rim-engaging plate 4, as by means of small bolts 7 secured through the plate 4 and taking through slots 8 in the guide-carrying plate proper. The heads of the bolts 7 are of a size to overlap the slotways 8 and interposed under the heads of the bolts are spring washers 9, whereby a frictional holding is had, maintaining the entire guide plate in position to which it may be laterally adjusted with respect to the plate 4 to the rear thereof.

As indicated, the entire holder H is detachably securable to the spectacle frame, and a preferable construction for this purpose includes a channel piece 10 which is secured to the rim-abutting plate 4, conveniently by the aforementioned bolt 7, such as to allow of ready setting of the channel piece 10 within the rim, as seen more clearly by reference to Fig. 2. At the opposite side of the holder, a coacting channel-like member 11 is provided, capable similarly of engaging inside of the spectacle rim, but for convenience in assembly and disassembly, this channel-like member is preferably formed with slightly resilient projecting lugs 12, the whole thus forming a quickly-engaging snap-in arrangement which in place frictionally holds securely against separation. Rotative movement of the holder, in the case of a circular frame assembly is guarded against by suitable holding means, for instance a notch 13 in one edge of the holder capable of engaging the bridge of the frame.

The guide pieces 5 are preferably set slightly further apart below, for a purpose to be referred to more in detail hereinafter; and in the assembly of the structure so far described, it will be seen that each eye of the spectacle frame is thus provided with a snap-in holder providing spaced vertical guideways, the set of guideways for each eye being capable of slight lateral adjustment.

The test lenses, in the form of lens segments 14, are carried by a lens segment support 15 affording a base upon which cleats 16 may be screw fastened to clamp the lens segment in firm relation to its carrier. Projecting forwardly and below is a small lug forming a convenient handle 17, this preferably being of thin metal turned edgewise or at right angles to the segment, so as to interfere the least possible with line of vision in that direction. Upstanding from the ends of the segment support are resilient fingers 18, adapted to slide into the guide pieces 5 of the holder before mentioned. These fingers are preferably slightly rounded or in-turned at their ends as at 19, to allow more readily of introduction into the guideways, and in furtherance of ready introduction, the opposed guideways are spaced slightly further apart below, as was mentioned previously. In this manner, the segment mount will be seen to be capable of being readily slid into the guideways from below, and frictionally hold in any position therein to which adjusted.

The precise size of the lens segments 14 will depend somewhat upon particular types of finished lenses desired, and in case of requirements for bifocal lenses, such segments will be of a focal value including the total correction, distant and reading, and the entire testing set will include a convenient number of such segments, as rights and lefts and in a range of values covering the requirements customarily encountered. Of course considerable latitude is possible in the number and the arrangement of such respective segments for any particular test set. These segments also where for trifocal work, will include two zones, a lower zone 20, as in Fig. 7, and thereabove a zone 21 which may be of desired width, for instance 8 millimeters and such zone may be of desired value intermediate between the value of the upper or distant portion of the finished lens, and the lower or closed reading segment portion. For instance this may be 1.62 D. less than the lower zone value.

The manner of use in testing will be understood from the foregoing. The determination of correction for distance will have been made in accordance with any usual or preferred procedure, likewise the determination of the correction for reading. With the so-determined total correction for reading then, test segments of such value are placed in the holders in a frame adjusted to the patient, the segments being inserted, as mentioned by sliding in from below. The test segments being positioned generally in accordance with the apparent requirements, the patient is asked to read. Adjustment for height of the segments and for pupillary distance is now carried out, the adjustable anterior portions allowing of lateral separation and return toward the center in successive adjusting movements as required by reference to the results as expressed by the patient, until the respective centering of the segments is brought to a satisfactory positioning. The frictional character of the engagement between the elements of the holder, as seen, maintains the position at any desired adjustment. The final proper positioning of the segments vertically is concluded by having the patient not only read, but also walk about, such changes and adjustments up and down being carried out as dictated by the necessities developed. In this manner, the position of the segments in respect to the various factors involved, can be correlated and determined with accuracy, and in exact accordance with the ultimate conditions to be incurred by the user. By the provision of scales or graduations on at least a part of the guide members 6, such graduations being for instance in millimeters, it will be seen that the position of the segment in each case is accurately indicated by the index pointer 22 on finger 18 registering along the scale, and in this manner the requirements may be ascertained in exact terms with the reference to center line, and the prescription may be correspondingly rendered free from guess work and approximation. By reason of the considerable range of difference in head posture of various individuals, it will be readily seen that in this respect a variation of one or two millimeters in the positioning of the bifocal segment may make the difference between success and failure as regards a comfortable fit for the user of such glasses.

It will be observed also that by reason of the lateral or pupillary distance adjustment feature, the positioning of the segments with respect to pupillary distance is now brought to a condition of exactness, and the prescription can be explicit as to pupillary distance for segments as well. Thus in the finished product, whether of the cemented on type or the invisible type, the reading segments may be adapted with the ultimate precision to the peculiar requirements of the individual, and thereby a great source of complaint heretofore made against bifocals may be obviated.

As seen also, it becomes possible at the same time to accurately fit for trifocals, and this form, which heretofore on account of the difficutly of fitting has not attained the usage it deserves, becomes available with exactness and simplicity. A finished lens of this type thus provides not only the usual upper segment 23 for distance (Fig. 9), and the lower segment 24 for close reading, but also an intermediate segment 25 of value suitable for good vision at intermediate distances, and having the further advantage of avoiding the extremely abrupt line between distant and reading portions as may be the case with bifocals.

The lightness and general inconspicuous character of the test segments, further facilitated by the handle lug 17 being placed at right angles to the segment, facilitates rapid changes and adjustments, and at the same time the handle lugs by reason of such arrangement may be of ample size to carry the requisite numbering indicative of the diopter power of the segment. In the event of breakage of the segment, or occasion generally for change, the cleats 16 may be readily removed, and a new segment be placed.

Other modes of applying the principle of the invention may be employed, change being made as regards the details disclosed, provided the means stated in any of the following claims, or the equivalent of such be employed.

I therefore particularly point out and claim as my invention:—

1. Eye-testing equipment, which comprises a lens-holder adapted to engage a spectacle frame, lens-guide means in said holder, means for laterally adjusting said lens-guide means, a segmental test-lens engageable in said guide means, and means for holding said segmental test-lens in any vertical position in said lens-guide means.

2. Eye-testing equipment, which comprises a lens-holder adapted to engage a spectacle frame, vertical guides on said holder, a segmental test-lens slidable in said guides, and resilient fingers extending up from said test-lens to frictionally engage in said guides.

3. Eye-testing equipment, which comprises a lens-holder adapted to engage a spectacle frame, vertical guides on said holder, a lens-segmental support slidable in said guide, a lens-segment carried by said support, and resilient fingers extending upwardly from the ends of such support expansively slidable in said guides whereby to hold the lens-segment in any desired vertical position.

4. Eye-testing equipment, which comprises a lens-holder adapted to engage a spectacle frame, vertical guides on said holder, a lens-segmental support slidable in said guides, a lens-segment carried by said support, and a handle projecting from the lower portion of said lens-support bent in the line of vision.

5. Eye-testing equipment, which comprises a lens-holder adapted to engage a spectacle frame, vertical guides on said holder, a lens-segmental support slidable on said holder, a lens-segment carried by said support, resilient fingers projecting upwardly from the ends of said support and expansively slidable in said guides, a pointer on one of said fingers, and a scale on a corresponding guide.

6. Eye-testing equipment, which comprises a rim-abutting plate adapted to engage a spectacle frame, a guide-carrying plate on said rim-abutting plate, and means for laterally adjusting said guide-carrying plate on said rim-abutting plate.

7. Eye-testing equipment, which comprises a rim-abutting plate adapted to engage a spectacle frame, a guide-carrying plate on said rim-abutting plate, means for lateral movement of said guide-carrying plate on said rim-abutting plate, and means for frictionally holding said guide-carrying plate in adjusted position.

8. Eye-testing equipment, which comprises a rim-abutting plate adapted to engage a spectacle frame, a guide-carrying plate on said rim-abutting plate, bolts extending from said rim-abutting plate through horizontal slots in said guide-carrying plate, and spring washers frictionally interposed between the bolt heads and the guide-carrying plate.

9. Eye-testing equipment, which comprises a rim-abutting plate adapted to engage a spectacle frame, resilient snap-projections on said plate for locking within the spectacle rim, vertical guides carried by said rim-abutting plate, means for adjusting said guides laterally, and a segmental test-lens vertically adjustable in said guides.

10. Eye-testing equipment, which comprises lens-holders adapted to engage in the rims of spectacle frames, resilient projections on said holders for retaining them within the rims, vertical guides on said holders, means for laterally adjusting said guides, and a series of segmental test-lenses each having a segment-receiving support and resilient fingers extending upwardly therefrom for riding in said guides.

11. Eye-testing equipment, which comprises lens holders adapted to engage in the rims of a spectacle frame, resilient projections on said holders for retaining them within the rims, vertical guides on said holders, means for laterally adjusting said guides, graduation marks on certain of said guides, and a series of segmental test-lenses, each having a segment-receiving support and spring guide-engaging fingers extending up at the ends of said support and a graduation-index pointer on certain of said fingers.

Signed by me this 3rd day of December, 1928.

JOSEPH W. SMITH.